Feb. 21, 1933.   R. P. LANSING   1,898,973
GENERATOR EQUIPMENT
Filed March 3, 1931
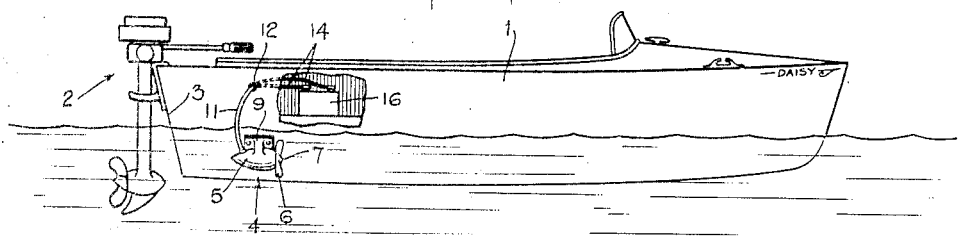
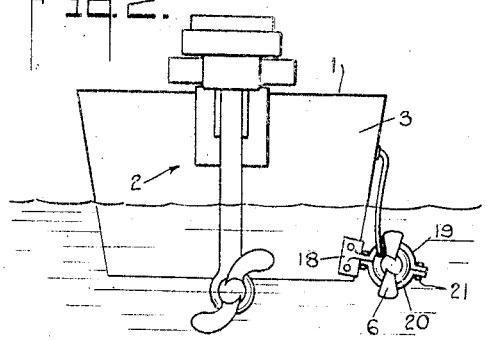
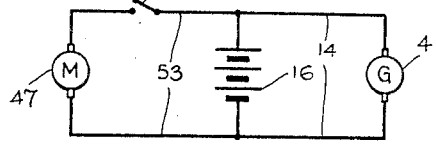
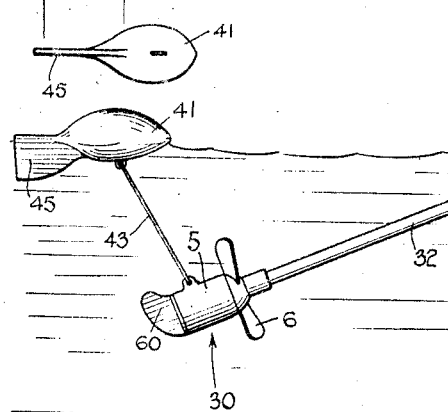
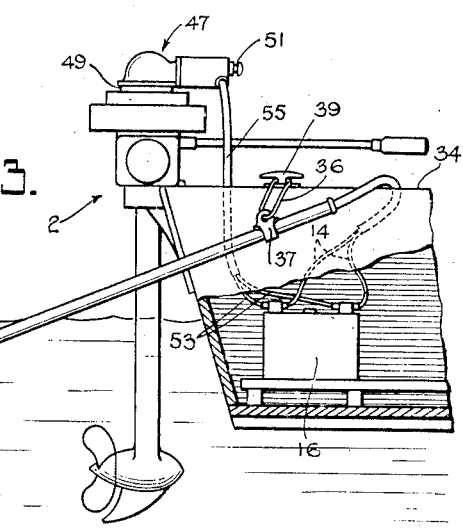
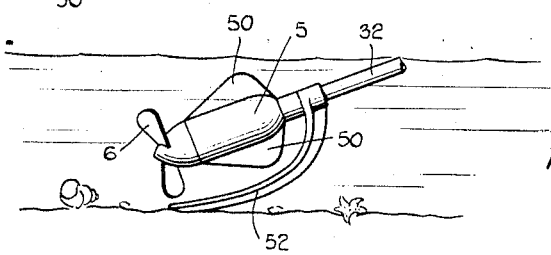
INVENTOR
Raymond P. Lansing
BY
F. B. Smith
ATTORNEY Patented Feb. 21, 1933

1,898,973

UNITED STATES PATENT OFFICE

RAYMOND P. LANSING, OF MONTCLAIR, NEW JERSEY, ASSIGNOR TO ECLIPSE AVIATION CORPORATION, OF EAST ORANGE, NEW JERSEY, A CORPORATION OF NEW JERSEY

GENERATOR EQUIPMENT

Application filed March 3, 1931. Serial No. 519,883.

This invention relates to boats, including outboard motor boats, and generator equipment in or for boats or other purposes to which such equipment is or may be adapted.

The general object is to provide a novel and improved means, or system, of generating and supplying electric current, useful for various purposes, and especially in boats.

Particularly with respect to boats, a principal object is to provide economical, simple and readily installable equipment for furnishing electric current for any desired utilization including charging a storage battery, which is thus available for energizing an engine-starting motor, lighting, and any other purposes for which current supply may be desired.

An important or principal field of utility is in boats propelled by outboard motors (hereafter called engines) and, while the invention is not limited to such uses, its nature and advantages will be fully understood by consideration of common characteristics of outboard motor craft, and of means by which generator current supply is provided for such craft, in accordance with the invention, as herein disclosed.

The outboard engine is mounted, usually, at the stern, and for various considerations, such as portability, minimizing cost, weight, and mechanical complications, etc., it is usually not provided with a generator, nor is any generator customarily provided in the boat, since hull dimensions, hull capacity, total permissible equipment cost, difficulty of connecting the outboard engine to a generator located elsewhere in the hull, and impracticability of providing any other prime mover for a generator, often prohibit such equipment in a boat of this class.

Generator current supply is, however, highly desirable, in order to charge and maintain charge in an accumulator (storage battery) of reasonable size and weight, sufficient to energize an engine starting motor, to light the boat, or for other purposes.

To meet this demand, in a practical way and at moderate cost, the invention provides a generator located at a convenient position about the hull, and a propeller, impeller or "water-mill" immersed in the water adjacent the hull and suitably connected to drive the generator. The motive force for turning the generator is thus derived from the forward movement of the boat, by reaction upon the generator propeller, of the relatively stationary water body through which it is drawn; or, as otherwise considered, this force or power is indirectly supplied by the boat engine, without mechanical or other direct connection to the generator.

Thus mechanical complications and cost of generator equipment are avoided, or reduced to a minimum.

To still further simplify the equipment and reduce its cost, the invention also provides, in preferred forms, as here shown, for supporting or maintaining the generator partly or entirely immersed in the surrounding water, and directly associated with or connected to its propeller (impeller or "water-mill"), with suitable provisions for waterproofing, bringing the generator leads into the hull, etc., as will appear.

The characteristics and advantages of the invention are further sufficiently explained in connection with the following detail description of the accompanying drawing, which shows certain representative embodiments. After considering these examples, skilled persons will understand that many variations may be made without departing from the principles disclosed; and I contemplate the employment of any structures that are properly within the scope of the claims appended.

Fig. 1 is a side elevation of an outboard motor boat, provided with generator mechanism or equipment embodying the invention in one form.

Fig. 2 is a stern elevation, showing a different location or arrangement of the generator and its driving motor, impeller or "water-mill".

Fig. 3 is a side elevation, with parts broken away or in section, of the after part of a boat of the same class, showing other modifications of the generator equipment and incidental features.

Fig. 4 is a bottom plan of the float shown in Fig. 3.

Fig. 5 is a side elevation of a variation or modified arrangement of the apparatus, of the general type shown in Fig. 3.

Fig. 6 is a diagram of the electric circuit of Fig. 3.

In the form or arrangement shown in Fig. 1, the hull 1 is of any known or suitable type for outboard propulsion; a conventional outboard engine 2 is secured in the most usual position, that is, to the stern board 3.

A generator 4 of any suitable type or current output characteristics is enclosed in a casing 5, with adequate provision for excluding water. Details of waterproofing means or expedients are not a part of the invention, and will therefore not be referred to further, except briefly with regard to certain items.

A hydraulic generator driver 6 is provided, in the form as here shown, of a marine propeller of moderate dimensions, representing in a broad sense any known or suitable water actuated motor or impeller for driving the generator at a proper speed with reference to the average boat speed. The propeller is revolubly mounted, as by connecting it directly on the generator armature shaft 7, or by revolvably supporting it upon the casing, with gear connection to the armature, or otherwise. Suitable packing is provided to exclude water about the shaft or at the "joint" or annulus of juncture between the propeller and casing 5.

The generator with its water motor or impeller, in the form shown, constitutes a self-contained current generating unit, compact, economical, and most easily installed upon the hull, in any of various desired positions.

As shown in Fig. 1, the generator unit is secured by a suitable bracket 9 to the hull side, near the stern, the bracket being so designed as to submerge the unit and particularly the propeller 6, substantially or completely below the water surface (i. e., below the normal load waterline of the craft), and outward sufficiently to permit propeller-rotation without contact with the hull.

The generator output leads may be brought into the hull in any of various ways. As shown in Fig. 1 (and also in Fig. 2) a conductor conduit 11 of flexible, waterproof type is connected to or into the generator casing 5 (in a waterproof manner), and passes through the hull side at 12, also with packing or other waterproofing at this point, if necessary. The leads 14 are brought from the generator brushes, through the conduit, and within the hull are directed as desired, the modes of utilization of generator current being optional, in the broader aspect of the invention.

In a preferred adaptation or arrangement, however, as shown (Fig. 1 and elsewhere) the leads 14 are connected to the terminals of an accumulator (storage battery) 16, from which connections are made to lamps, engine starting motor, or other places or apparatus about the boat, as desired.

In operation, as the boat is driven through the water at normal speed, by the engine 2, the generator propeller is drawn through the relatively stationary water at the boat side, and is thus rotated at a speed adequate to drive the generator at designed speed, and to furnish current of voltage and amperage sufficient at least to maintain charge in the accumulator (with excess capacity as may be desired or practicable). Any known or suitable charge regulating means or system may be provided.

While the unit arrangement of the generator and its motor, as above described, is highly desirable, and preferred in some cases, this is not essential, in the broader aspect of the invention, and the generator may be substantially remote from its motor. Such arrangement is not here particularly illustrated, but is comprehended in the scope of certain of the claims.

The generator, its hydraulic motor, or both, when arranged as a unit, located outside the hull, are identified in some cases (especially in certain of the claims) as an "outboard" generator, generator motor, or generator unit.

Fig. 2 shows a generally similar construction and arrangement of the generator equipment; in this case, however, the supporting bracket 18 is bolted to the stern board 3, thus locating the outboard generator unit at the stern and outward from the hull side. The generator casing is supported movably (adjustably) or detachably in a two-part socket, one part 19 of which is carried by bracket 18 and the other part 20 is separate and secured as by bolts 21, this representing broadly any suitable releasable clamp for mounting the unit detachably and in different position, without necessary repositioning of the supporting bracket. Thus, if desired, the position of the unit may, in an obvious way, be reversed (as compared with the position shown in Fig. 1) by turning it end for end; the propeller will then be aft of the motor casing and its plane of rotation may be aft of the stern board, thus permitting a propeller of larger radius to be used, if desired, while the generator remains in close proximity to the hull side. This detachable or reversible mounting feature also provides advantageous facility for proper installation at either side of the boat (as when the bracket is not of reversible or invertible character) by placing the propeller either ahead or astern of the generator, so that the same propeller of either right or left hand blade pitch may drive the generator in the proper direction, when located at either side of the hull.

Such reversal of the generator unit, or other arrangement by which the propeller or impeller is located aft of the generator, is sufficiently indicated in Fig. 2.

In the modified embodiment of the invention shown in Fig. 3, the generator unit 30 is located considerably aft of the stern, and is connected to a tube 32, which may be of rigid construction. The tube is attached to the hull at a convenient place, such as either gunwale 34, preferably by a movable or articulated connection, consisting, as shown, of a link 36, which is pivotally connected to a lug 37 secured to the tube near its forward end, and is also engaged with a hook or cleat 39 fastened on the gunwale (or hull side), representing any suitable means for movably and/or detachably connecting the link and the complete generator unit, including the tube, to the hull. The propeller 6 may be arranged to rotate on or about the tube, which is in such case connected to an internal member of the generator frame or casing, and the armature shaft may be connected to the propeller by gearing; or the position of the generator or propeller may be reversed, so that the propeller is at the rearward end of the casing; in this case the tube may be connected to the forward end of the casing and the propeller may be mounted directly on the generator shaft, if desired, without intermediate gearing. Such a reversed arrangement of the unit is further referred to below, with reference to Fig. 5.

The generator casing may be provided with a directing fin or rudder 60, located, in the case of Fig. 3, at the rear end of the casing.

As the boat moves forward, reaction of water on the tube 32, propeller and generator casing will be sufficient, in some cases, to maintain the generator unit in proper vertical position at a moderate distance below the surface, especially as the weight of the unit may be not greatly in excess of the weight of the water displaced by it; otherwise, a float 41 may be provided, connected to the generator casing by suitable means, such as a flexible cord or rope 43. The float sustains a desired part of the weight of the generator unit, and maintains it at the desired position below the water surface, as controlled or regulated by the length of the cord.

The float may be of approximate boat form, as shown in Figs. 3 and 4, and the cord 43 is connected to it or near its center of gravity, or somewhat forward of such center, to insure smooth and true towing movement of the float, without wabbling; and to additionally direct the float and prevent wabbling and erratic movement, it desirably has at its stern a fixed rudder formation 45 of substantial length and submerged area.

The generator leads 14 are run through the supporting or towing tube 32 and over the gunwale to the terminals of battery 16; the connection of tube 32 positively (although movably) to the hull prevents any strain being applied to the conductors.

As also shown in Fig. 3, the outboard engine 2 is provided with a starting motor 47, mounted on the engine frame or crank case 49, and the motor has a controlling switch 51. The battery 16 is connected (through the switch) to the motor terminals, by conductors 53, which may be cabled or passed through a flexible or other conduit 55. The circuit is shown in Fig. 6.

The generator equipment in this case furnishes current supply, to maintain charge in a storage battery, for power starting of the engine (or for other purposes, as sufficiently referred to previously) in a simple economical manner, and without the mechanical complication which would be involved in mechanical connection of the outboard engine to a generator located within the hull.

Fig. 5 shows a reversed arrangement of the generator unit, in which the generator casing 5 is connected to the rear end of tube 32 and the propeller or impeller 6 is mounted at the after end of the generator, directly on the armature shaft. The casing is also provided with directing or rudder fins 50.

A guard 52 is also included, connected at its forward end to tube 32 (or it may otherwise be connected to the generator casing) and extending curvedly rearward under the generator and propeller, to protect the latter from engagement with the bottom, in shallow water, or from floating obstructions such as logs. This represents in a broad sense any suitable guard or protecting means for the propeller or generator unit.

It will be now understood that, while the invention is especially advantageous when applied to outboard motor boats, it may also be utilized in motor craft of various types and sizes, however powered or driven, and may even have a considerable field of utility in sailing craft, with or without auxiliary engines, when the speed in average winds is sufficient to drive a water motor at proper speed for generator operation.

What is claimed is:—

1. In combination with a boat, a generator unit substantially submerged in water adjacent the hull and including a hydraulic motor, and means adapted to support the unit in either of two relatively reversed positions in relation to the hull.

2. In a boat, a generator, a hydraulic motor interposed between said boat and generator to move with the boat in water adjacent the hull and also connected to drive the generator, and a float only partially supporting the motor.

3. In combination with a boat, a generator unit substantially submerged in water adjacent the hull and including a hydraulic motor, a member connected to the hull to support the unit in movable relation to the hull, a float connected to the unit and supporting it in substantially definite position below the water surface, and means suspended from said supporting member for deflecting solid substances from the path of said unit.

4. In combination with a boat, a generator and a hydraulic impeller therefor located adjacent the hull, a substantially rigid tube connected at its rearward end to the generator and impeller, and means movably connecting a forward portion of the tube to the hull.

5. In combination with a boat, a generator and a hydraulic impeller therefor located adjacent the hull, a substantially rigid tube connected at its rearward end to the generator and impeller, and means detachably connecting a forward portion of the tube to the hull.

6. In combination with a boat, a generator and a hydraulic impeller therefor located adjacent the hull, a substantially rigid tube connected at its rearward end to the generator and impeller, and means movably and detachably connecting a forward portion of the tube to the hull, said generator, propeller and tubes being disposed in coaxial alignment.

7. In combination with a boat, a generator and a hydraulic impeller therefor located in water adjacent the hull, a tube towingly connecting the generator and impeller to the hull, and a freely movable link connection between the hull and the forward portion of said tube.

8. In combination with a boat, a generator and a hydraulic impeller therefor located adjacent the hull, a substantially rigid tube connected at its rearward end to the generator and impeller, means movably connecting a forward portion of the tube to the hull, and generator conductors running through the tube and into the hull.

9. In a boat, a generator submerged in water adjacent the hull and connected to move with the boat, and a hydraulic motor also substantially submerged in water adjacent the hull and connected to drive the generator, the generator including a waterproofing casing, a waterproof tube leading from the casing to the hull, means secured to the hull for pivotally suspending one end of said tube, and buoyant means for suspending the other end of said tube.

10. In combination with a boat, a generator located below the water line of the boat and adjacent the hull, a tube towingly connecting the generator to the hull, a flexible connection disposed in the wake of the generator, and means attached to the end of said flexible connection for supporting the generator in a substantially definite position below said water line.

In testimony whereof I have signed this specification.

RAYMOND P. LANSING.